United States Patent
Qi et al.

(10) Patent No.: US 10,171,592 B2
(45) Date of Patent: Jan. 1, 2019

(54) TECHNIQUES FOR MULTI-LEVEL SERVICE DISCOVERY

(71) Applicant: INTEL CORPORATION, Santa Clara, CA (US)

(72) Inventors: Emily H. Qi, Portland, OR (US); Minyoung Park, Portland, OR (US); Po-Kai Huang, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 935 days.

(21) Appl. No.: 13/659,654

(22) Filed: Oct. 24, 2012

(65) Prior Publication Data

US 2014/0112245 A1    Apr. 24, 2014

(51) Int. Cl.
- *H04L 29/08* (2006.01)
- *H04L 29/12* (2006.01)
- *H04W 84/18* (2009.01)

(52) U.S. Cl.
CPC .......... *H04L 67/16* (2013.01); *H04L 61/6004* (2013.01); *H04W 84/18* (2013.01)

(58) Field of Classification Search
CPC .................................................... G06F 15/173
USPC ........................................................ 709/229
See application file for complete search history.

(56) References Cited

U.S. PATENT DOCUMENTS

| | | | | |
|---|---|---|---|---|
| 5,001,702 A * | 3/1991 | Teraslinna | .......... | H04L 12/1836 370/392 |
| 6,922,785 B1 * | 7/2005 | Brewer | ............... | H04L 63/0428 380/28 |
| 7,106,742 B1 * | 9/2006 | Frisch | .................. | H04L 1/0061 370/236 |
| 7,734,717 B2 | 6/2010 | Saarimaki et al. | | |
| 7,852,757 B1 * | 12/2010 | Puranik | ................... | H04L 47/10 370/229 |

(Continued)

FOREIGN PATENT DOCUMENTS

| | | | |
|---|---|---|---|
| CN | 101686102 A | * | 3/2010 |
| JP | 2008271041 | | 11/2008 |

OTHER PUBLICATIONS

Understanding Public Key Cryptography dated May 19, 2005 Retrieved from: https://technet.microsoft.com/en-us/library/aa998077(v=exchg.65).aspx.*

(Continued)

*Primary Examiner* — Douglas B Blair
*Assistant Examiner* — Ishrat Rashid

(57) ABSTRACT

Examples are disclosed for multi-level service discovery. In some examples, a first level of information indicating a service type for a service provided by a first wireless device may be transmitted by the first wireless device to another wireless device. The first level may enable the other wireless device to determine whether the indicated service type at least partially matches a service interest. A second level may then be transmitted by the first wireless device that includes a service identification to enable the other wireless device to determine whether the service substantially matches a service interest for the other wireless device. A third level may then be transmitted from the first wireless device that includes service content information. The third level may be transmitted responsive to the other wireless device requesting the service content information. Other examples are described and claimed.

24 Claims, 11 Drawing Sheets

(56) References Cited

U.S. PATENT DOCUMENTS

| | | | | |
|---|---|---|---|---|
| 7,899,030 B2* | 3/2011 | Mayhew | ................. | H04L 49/25 370/351 |
| 2006/0259602 A1* | 11/2006 | Stewart | .................. | H04L 67/16 709/223 |
| 2010/0054154 A1* | 3/2010 | Lambert | ........... | H04L 29/12311 370/254 |
| 2011/0105024 A1* | 5/2011 | Palin | ..................... | H04W 8/005 455/41.2 |
| 2011/0153818 A1* | 6/2011 | Vandwalle | .............. | H04L 67/16 709/224 |
| 2012/0079128 A1 | 3/2012 | Stirbu et al. | | |
| 2012/0134490 A1* | 5/2012 | Liu | ....................... | H04L 9/0662 380/28 |

OTHER PUBLICATIONS

International Search Report and Written Opinion received for PCT Patent Application No. PCT/US2013/048114, dated Oct. 18, 2013, 14 pages.

Cai et al., "WFA Neighbor Awareness Network", Powerpoint presentation retrieved at <http://www.google.com/#hl=en&tbo=d &sclient=psy-ab&q=WFA+Neighbor+Awareness+Network&oq= WFA+Neighbor+Awareness+Network&gs_I=hp.12..33i21.29649. 73367.0.75388.30.30.0.0.0.0.134.1993.29j1.30.0.1es%3B..0.0...1c. 1.eErZ7oD7LIs&pbx=1&bav=on.2,or.r_gc.r_pw.r_qt&bvm=bv. 41248874,deWU&fp=94e32a4cea89f529&biw=1539&bih=435>, Jan. 22, 2013, 21 pages.

* cited by examiner

600

```
TRANSMIT, FROM A FIRST WIRELESS DEVICE, A FIRST LEVEL
OF INFORMATION INDICATING A SERVICE TYPE FOR A
SERVICE PROVIDED BY THE FIRST WIRELESS DEVICE TO ONE
OR MORE OTHER WIRELESS DEVICES
602
```

```
TRANSMIT A SECOND LEVEL OF INFORMATION FOR THE
SERVICE THAT INCLUDES A SERVICE IDENTIFICATION
604
```

```
TRANSMIT A THIRD LEVEL OF INFORMATION FOR THE
SERVICE THAT INCLUDES SERVICE CONTENT INFORMATION
606
```

```
PROVIDE THE SERVICE TO A SECOND WIRELESS DEVICE
FROM AMONG THE ONE OR MORE WIRELESS DEVICES
RESPONSIVE TO THE SECOND WIRELESS DEVICE
REQUESTING THE SERVICE
608
```

*FIG. 6*

Storage Medium 700

*Computer Executable Instructions for 600*

*FIG. 7*

*Storage Medium 1000*

*Computer Executable Instructions for 900*

*FIG. 10*

TECHNIQUES FOR MULTI-LEVEL SERVICE DISCOVERY

BACKGROUND

Wireless devices may include capabilities to access networks using various wireless access technologies. For example, these wireless devices may communicatively couple to each other through a wireless local area network (WLAN) using a wireless technologies such as Wi-Fi™. The wireless devices may also communicatively couple via peer-to-peer wireless technologies such as Bluetooth®. Wireless devices may also communicatively couple to each other via wireless wide area networks operated according to various third generation (3G) or fourth generation (4G) wireless technologies.

Typically wireless devices may search for other wireless devices to either provide services to other wireless devices or consume services provided by other wireless devices. Some popular service discovery protocols such as Universal Plug and Play (UPnP), Bonjour, and Bluetooth®—service discover protocol (SDP) may focus mainly on wireless devices proactively searching for a desired or required service. However, the growing number of network capable wireless devices has led to relatively denser and more crowded signal environments. This dense environment may present difficulties for a proactive search to find services of interest.

BRIEF DESCRIPTION OF THE DRAWINGS

FIG. 6 illustrates an example of a first logic flow.
FIG. 7 illustrates an example of a first storage medium.
FIG. 10 illustrates an example of a second storage medium.

DETAILED DESCRIPTION

Figure 1:
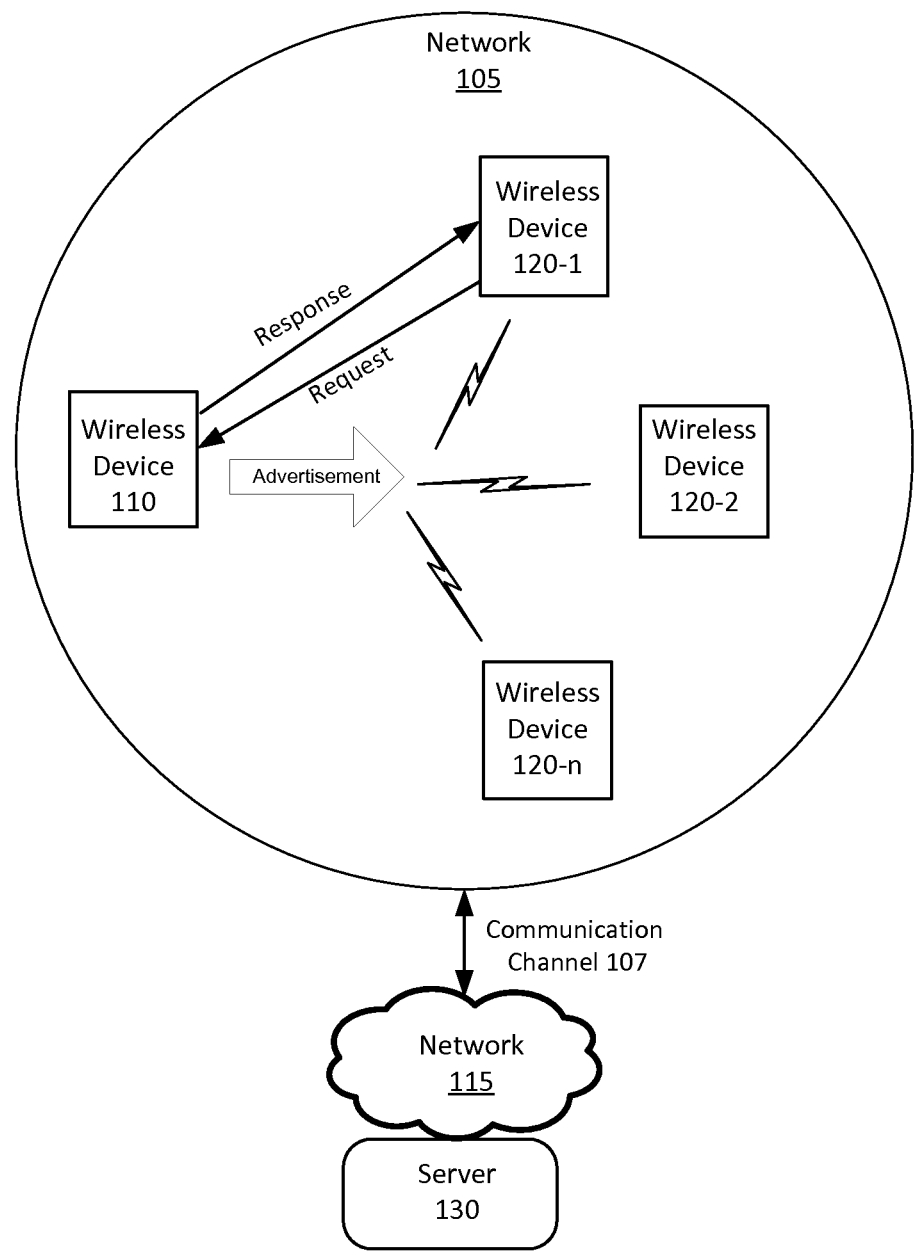
FIG. 1 illustrates an example of a system.

Examples are generally directed to improvements for WLANs, peer-to-peer wireless networks (e.g., Bluetooth®) or WWANs using wireless mobile telecommunication cellular or wireless mobile broadband technologies. Wireless mobile broadband technologies may include any wireless technologies suitable for use with wireless devices or user equipment (UE). For example, wireless devices operating or coupled to a WLAN may be configured to operate in compliance with various WLAN standards promulgated by the Institute of Electrical Engineers (IEEE). These WLAN standards may include Ethernet wireless standards (including progenies and variants) such as the IEEE Standard for Information technology—Telecommunications and information exchange between systems—Local and metropolitan area networks—Specific requirements Part 11: WLAN Media Access Controller (MAC) and Physical Layer (PHY) Specifications, published March 2012, and/or later versions of this standard ("IEEE 802.11"). Wireless mobile broadband technologies may also be associated with peer-to-peer or device-to-device wireless standards (including progenies and variants) that may include but are not limited to the Bluetooth Core Specification, Version 4.0, published June 2010 ("Bluetooth®").

Wireless mobile broadband technologies may also include any wireless technologies suitable for use with wireless devices or UEs such as one or more 3G or 4G wireless standards (including progenies and variants). Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8, 9 or 10 of LTE/System Architecture Evolution (SAE), and so forth. The examples are not limited in this context.

As contemplated in the present disclosure, a dense signal and/or wireless device environment may present difficulties for a proactive search to find services of interest to a wireless device. Denser and more crowded signal and/or wireless device environments may strain wireless networks and place a burden on a wireless device's ability to advertise its available services in a cluttered signal environment. Further, wireless devices searching for services of interest to the users of these wireless devices may find it increasingly difficult or burdensome to find and identify those services of interest. It is with respect to these and other challenges that the examples described herein are needed.

In some examples, techniques are implemented for multi-level service discovery. These techniques may include, a first level of information indicating a service type for a service provided by a first wireless device being transmitted by the first wireless device to one or more other wireless devices. The first level of information may enable the one or more other wireless device to determine whether the indicated service type at least partially matches a service interest for the one or more other wireless devices. A second level of information for the service may then be transmitted by the first wireless device that includes a service identification to enable a second wireless device from among one of the one or more other wireless devices to determine whether the service substantially matches the service interest for the second wireless device. A third level of information for the service may then be transmitted from the first wireless device that includes service content information. The third level of information may be transmitted responsive to the second wireless device requesting the service content information.

According to some examples, the service content information received by the second wireless device may enable the second wireless device to determine that the service content information completely matches its service interest. For these examples, the first wireless device may then provide the service to the second wireless device responsive to receiving a request from the second wireless device for the service.

FIG. 1 illustrates an example system 100. In some examples, as shown in FIG. 1, the system 100 includes a network 105. Also, as shown in FIG. 1, network 105 includes wireless devices 110 and 120-1 to 120-n, where n equals any positive integer greater than 2. Also, as shown in FIG. 1, network 105 may couple to network 115 via communication channel 107. Network 115, as shown in FIG. 1, may also couple to or may include a server 130.

In some examples, network 105 may operate in compliance with one or more wireless network technologies (e.g., IEEE 802.11/Wi-Fi™, Bluetooth® or 3GPP LTE-A). For these examples, the wireless devices included in network 105 may also be arranged or capable of coupling to network 115 via communication channel 107 in order to communicate with server 130. Communication channel 107 may include one or more types of communication mediums to include wired or wireless communication mediums configured to communicatively couple the wireless devices of network 105 to network 115. For example, communication channel 107 may be a wired Ethernet connection for a WLAN access point and server 130 may be an Internet-based server accessible through network 115. Alternatively, communication channel 107 may be either a wireless Ethernet or a wireless broadband connection routed through a WWAN base station or evolved Node B (eNB).

According to some examples, as shown in FIG. 1, wireless device 110 may wirelessly transmit an advertisement for a service to wireless devices 120-1 to 120-n. For these examples, wireless device 110 may be capable of providing one or more services of interest to wireless devices 120-1 to 120-n. These services of interest may include, but are not limited to a service associated with a social network, an entertainment guide, a restaurant guide, a friend locator service, a photo sharing service, a clothing guide, music guide, a shopping guide, a food nutrient guide, a consumer products rating guide, a store locator guide, a sale locator guide, an in-store product locator guide, a product guide or a coupon locator guide. Although FIG. 1 shows a single wireless device advertising one or more services, this disclosure contemplates a multitude of wireless devices also advertising one or more services to other wireless devices.

In some examples, as described in more detail below, wireless device 110 may include logic and/or features to generate a bit map to indicate a type of service in the advertisement (e.g., entertainment, restaurant, social network, shopping, music, food, locator, guide, etc.). For these examples, the wireless device 110 may also include logic and/or features to also generate a service identification for a service associated with the advertised type of service. The logic and/or features may encode service information for the service that provides more information about the service than just the service type. The service information may be encoded using a hybrid encoding structure that includes one or more encoding techniques. These one or more encoding techniques may include public encoding techniques, private encoding techniques and plain text encoding techniques.

The logic and/or features may also generate service content information associated with the service identification for the advertised type of service. The service content may include additional or detailed information on the service being advertised and may be generated and transmitted based on a request from a wireless device for more detailed information about the advertised service.

According to some examples, as described in more detail below, wireless devices 120-1 to 120-n may include logic and/or features to determine that a type of service indicated in a bit map received from wireless device 110 at least partially matches a service interest. The service interest, for example, may be associated with a respective user of wireless devices 120-1, 120-2 or 120-n. For example, a user of wireless device 120-1 may have an interest in entertainment services such as comedy nightclubs. Wireless device 120-1 may also include logic and/or features to decode a service identification having encoded service information for a service associated with the advertised type of service. As mentioned above, the service information may have been encoded using public, private or plain text encoding techniques. Once the service information is decoded, the logic and/or features of wireless device 120-1 may determine whether the decoded service information results in a substantial match with the service interest for the user of wireless device 120-1. For example, if the service information indicates a service associated with nightclubs a substantial match may occur. In this example, the logic and/or features of wireless device 120-1 may then generate a service content request based on the substantial match.

In some examples, as shown in FIG. 1, wireless device 120-1 may transmit the service request generated based on the substantial match of the interest in comedy nightclubs by the user of wireless device 120-1. For these examples, wireless device 110 may provide additional information about the advertised service (e.g., by generating and transmitting service content) in a response to the request. Wireless device 120-1 may then determine whether the additional information results in a complete match with the interest in comedy nightclubs. For example, if the additional information indicates a service associated with rating or reserving tickets for comedy nightclubs, a complete match may be determined. The logic and/or features of wireless device 120-1 may then take additional actions to receive the advertised service from wireless device 110.

According to some examples, the process of wireless device 110 providing various levels of information associated with an advertised service allows for a multi-level service discovery. The first level being very limited information that enables wireless devices 120-1 to 120-n to determine if they are at least partially interested in the service. Then a second level of information may provide another layer of information to allow wireless devices 120-1 to 120-n to make a better determination of interest in the service. The third level of information may then allow wireless devices 120-1 to 120-n to make an even more informed decision on whether to actually consume the service advertised by wireless device 110. Thus, advertising clutter may be reduced by this tiered discovery process and wireless devices searching for services may have less of a burden sifting through this reduced clutter.

Figure 2:
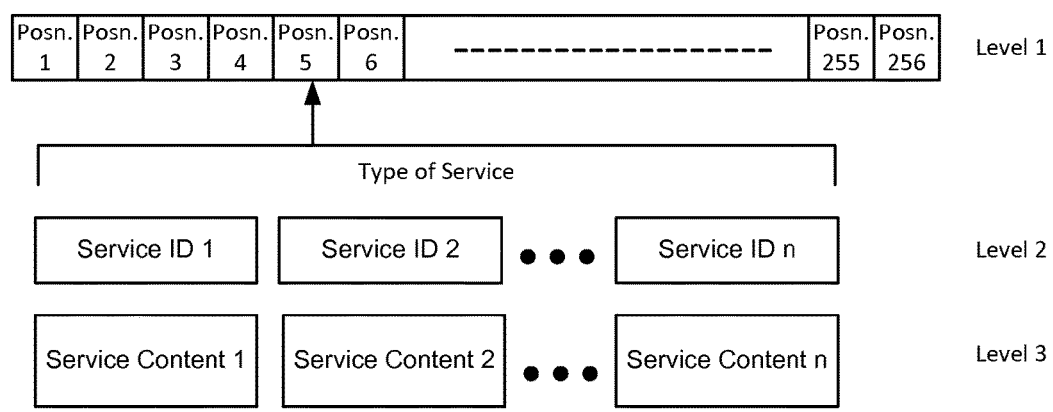
FIG. 2 illustrates an example bit map format.

FIG. 2 illustrates an example bit map format 200. According to some examples, as shown in FIG. 2, bit map format 200 includes 256 positions for the placements of bits. For these examples, the individual bit positions may indicate a type of service being wirelessly advertised by a wireless device such as wireless device 110. For example, as shown in FIG. 2, a bit in position 5 may indicate a type of service (e.g., entertainment) being advertised by a wireless device that generated a bit map in the format of example bit map format 200. Example bit map format 200 may represent a high level summary of service information advertised by the wireless device and either a "1" or a "0" in a given bit position may represent the wireless device's ability to provide a type of service assigned to the given bit position. Although bit map format 200 is shown as including 256 bit positions having a size of 32 bytes, other bit map formats having more or less bit positions are contemplated by this disclosure.

According to some examples, as shown in FIG. 2, a bit map generated by a wireless device in the format of bit map format 200 may include an indication in position 5 of support for a type of service. This indication may represent level 1 of a multi-level discovery process. Levels 2 and 3 may include layered information for a multitude of services having individual service identifications (IDs) at level 2 and service content information at level 3.

Figure 3:
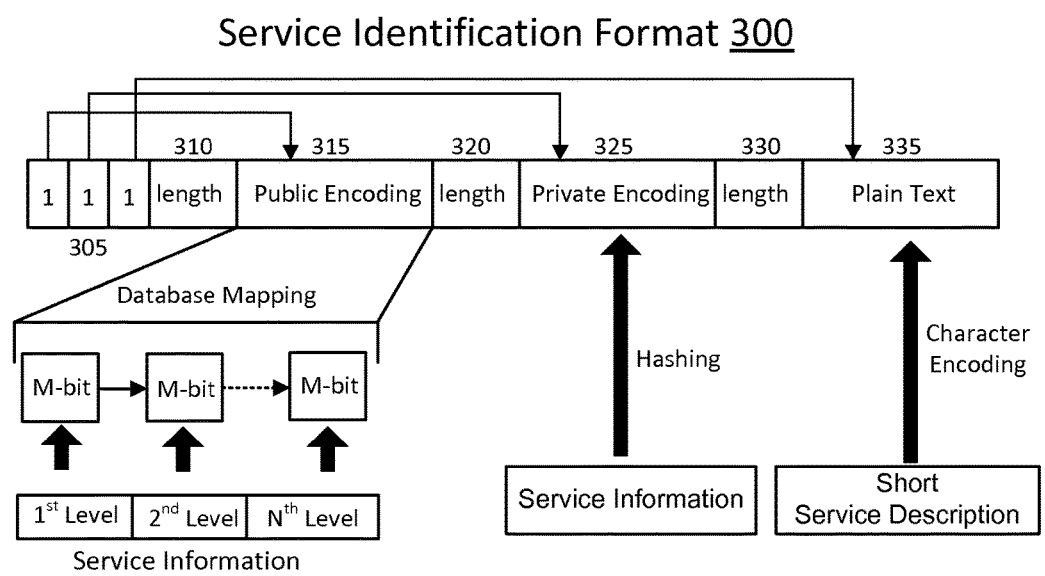
FIG. 3 illustrates an example service identification format

FIG. 3 illustrates an example service identification format 300. As shown in FIG. 3, service identification format 300 includes fields 305, 310, 320, 325, 330 and 335. In some examples, a service identification (e.g., in a data packet) may be generated in the format of service identification format 300. For these examples, the service identification may represent the next or second level of service information for an advertised type of service that may be advertised by a wireless device to one or more other wireless devices.

In some examples, as shown in FIG. 3, field 305 includes three bits. For these examples, each bit of field 305 may indicate encoding techniques used to encode service information for a service associated with an advertised type of service indicated in a bit map. For example, if the left most bit of field 305 has a value of "1" a public encoding technique was used to encode service information. If the center bit has a value of "1" a private encoding technique was used and if the right bit has a value of "1" a plain text encoding technique was used. Although FIG. 3 shows all three bits asserted or having a value of "1", in other examples other combinations of bits may be asserted such that at least one bit is asserted to indicate encoding technique(s).

According to some examples, field 310 may include length information associated with service information encoded using a public encoding technique and placed in field 315. Also, field 320 includes length information associated with service information encoded using a private encoding technique and placed in field 325. Further, field 330 includes length information associated with service information encoded using a plain text encoding technique and placed in field 335.

In some examples, a public encoding technique used to encode service information placed in field 315 may include information that directly maps to a database once decoded. For example, the encoded service information may include a string of 0's and 1's in field 315 that directly map to certain information maintained in the database. The database may be structured in a plurality of levels to enable a wireless device that decodes the information in field 315 to organize the service information and present the results to a user of the wireless device. Each level of information may have a sub-level of information, and so on and forth. Also, as shown in FIG. 3, each level of information may be represented by a fixed length block having M-bits, where "M" equals any positive integer. Each block of M-bits may be concatenated in multiple levels to reveal service information in different levels of details. As shown in FIG. 3, the different levels may include a $1^{st}$ level, a $2^{nd}$ level and an $N^{th}$ level. For example, the 1st level may be 2 bytes where 0x00 represents entertainment. Then for the entertainment, the $2^{nd}$ level may also be 2 bytes where 0x00 represents movies and 0x01 represents nightclubs.

In some examples, a private encoding technique used to encode service information placed in field 325 may include information encoded by hashing the information to create an indirect mapping between a string of 0's and 1's in field 325 and service information maintained in a database. For these examples, a hashing function may include an MD5 Message-Digest Algorithm specified in the Network Working Group, Request for Comment (RFC) 1321, published in April 1992 and then updated by the Internet Engineering Task Force (IETF) in RFC 6151, published in March 2011. The hashing function may also include secure hash algorithms (SHAs) such as SHA-1 or SHA-256 as specified in the Federal Information Processing Standards (FIPS) Publication 180-3, "Secure Hash Standard", published in October 2008.

According to some examples, a group of wireless devices (e.g., having users subscribed to a social network) may desire to have privacy when attempting to find each other. For example, a friend locator service may disseminate the hashing function or algorithm to be used to privately encode service information included in field 325 of a service identification generated using example service identification format 300. Only searching wireless devices having knowledge of this hashing function (e.g., by virtue of being in the advertisers social network) may be able to decode the service information included in field 325.

In some examples, the database(s) used to map (either directly or indirectly) decoded service information may be maintained in a variety of locations to include at the wireless device searching for the service, the wireless device advertising the service or at a server accessible to the searching or advertising wireless devices (e.g., server 130). For examples of where the database is maintained at the searching wireless device, the database may have been downloaded to the searching wireless device as part of an application download. For examples of where the database is maintained at a server, the searching wireless device may place queries to the server to obtain the layered database information or the advertising device may place the queries and forward the results to the searching device.

According to some examples, a plain text encoding technique used to encode service information placed in field 335 may include information encoded using a character-encoding scheme. The character-encoding scheme may include, but is not limited to, American Standard Code for Information Interchange (ASCII) described in Network Working Group, RFC 20, "ASCII format for Network Interchange", published in October 1969 or UCS Transformation Format—8-bit (UTF-8) described in Network Working Group, RFC 3629, "UTF-8, a transformation format of ISO 10646", published in November 2003. As shown in FIG. 3, the plain text encoding technique may include a short service description. The description may be short due to the relatively large number of bits needed to encode each character. For example, using ASCII, a 10 character phrase may require a plain text encoding in field 335 that has a length of 80-bits. Thus, to reduce the number of bits in a data packet in the format of service identification format 300, short concise service descriptions may be desired.

Figure 4:
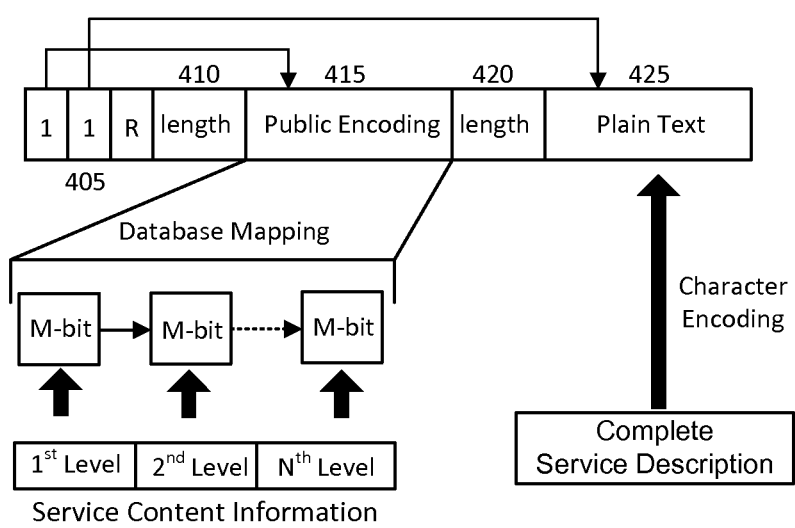
FIG. 4 illustrates an example service content format.

FIG. 4 illustrates an example service content format 400. As shown in FIG. 4, service content format 400 includes fields 405, 410, 415, 420 and 425. In some examples, service content (e.g., in a data packet) may be generated in the format of service content format 400. For these examples, the service content information may represent a third level of service information for a service that may be advertised by a wireless device to one or more other wireless devices. The service content information may incorporate most if not all of the information about the advertised service that may be available to the advertising wireless device In some examples, as shown in FIG. 4, field 405 includes at least 2 bits to indicate encoding techniques and a $3^{rd}$ bit that is reserved. As shown in FIG. 4, if the left most bit is asserted or has a value of "1", a public encoding technique was used to encode service content information. Also, if the center bit is asserted or has a value of "1", a plain text encoding technique was used to encode service content information. Although FIG. 4 shows two bits asserted or having a value of "1", in other examples other combinations of bits may be asserted such that at least one bit is asserted to indicate which encoding technique(s) were used.

Similar to service identification format 300, fields 410 and 420 may include length information to indicate the size or length of information encoded and placed in fields 415 and 425, respectively.

According to some examples, service content information encoded using a public encoding technique may be placed in field 415. Decoded service content information placed in field 415 may directly map to certain information maintained in a database structured to have a plurality of levels. Each level of information may have a sub-level of information. Also, as shown in FIG. 4, each level of information may be represented by a fixed length block having M-bits. As shown in FIG. 4, the different levels may include a $1^{st}$ level, a $2^{nd}$ level and an $N^{th}$ level.

According to some examples, a plain text encoding technique used to encode service information placed in field 425 may include service content information encoded using a character-encoding scheme such as ASCII or UTF-8. Limitations on the size or amount of data included in field 425 may not be as restrictive as information included in field 325 of a data packet generated in the format of service identification format 300. This may be due to searching wireless device having already filtering out other advertisements and being willing to receive larger and more detained information in subsequent data packets associated with the third level of the discovery process. Thus, as shown in FIG. 4, a complete service description may be encoded using character encoding and placed in field 425.

Figure 5:
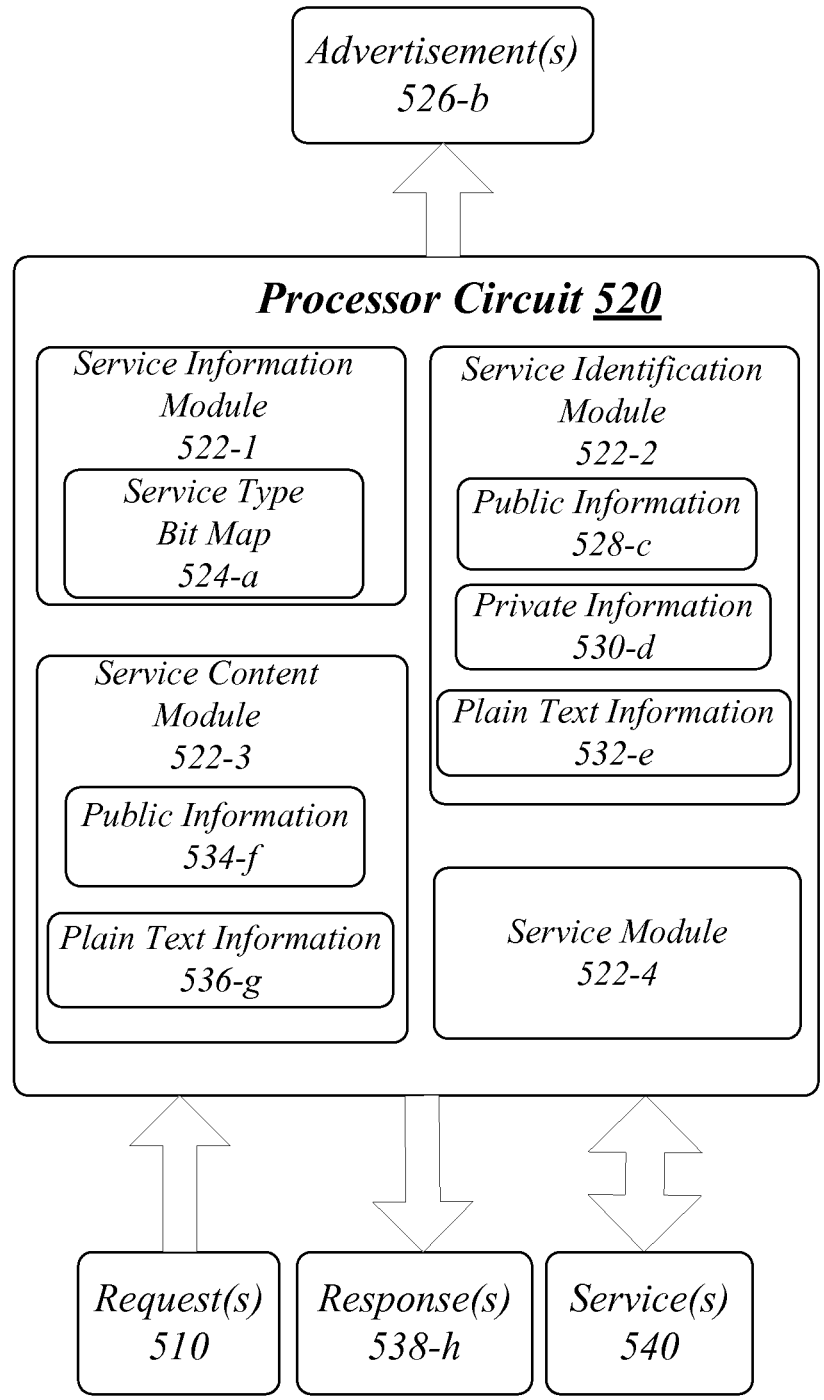
FIG. 5 illustrates an example block diagram for a first apparatus.

FIG. 5 illustrates a block diagram for a first apparatus. As shown in FIG. 5, the first apparatus includes an apparatus 500. Although apparatus 500 shown in FIG. 5 has a limited number of elements in a certain topology or configuration, it may be appreciated that apparatus 500 may include more or less elements in alternate configurations as desired for a given implementation.

The apparatus 500 may comprise a computer-implemented apparatus 500 having a processor circuit 520 arranged to execute one or more software modules 522-a. It is worthy to note that "a" and "b" and "c" and similar designators as used herein are intended to be variables representing any positive integer. Thus, for example, if an implementation sets a value for a=5, then a complete set of software modules 522-a may include modules 522-1, 522-2, 522-3, 522-4 and 522-5. The embodiments are not limited in this context.

According to some examples, apparatus 500 may be part of a wireless device arranged to operate in compliance with one or more wireless broadband technologies such as those described in the IEEE 802.11, Bluetooth® or 3GPP LTE Specifications. For example, apparatus 500 may be arranged or configured to communicatively couple to one or more wireless devices via an LTE and/or LTE-A, IEEE 802.11, or Bluetooth® compliant wireless network. The examples are not limited in this context.

In some examples, as shown in FIG. 5, apparatus 500 includes processor circuit 520. Processor circuit 520 may be generally arranged to execute one or more software modules 522-a. The processor circuit 520 can be any of various commercially available processors, including without limitation an AMD® Athlon®, Duron® and Opteron® processors; ARM® application, embedded and secure processors; IBM® and Motorola® DragonBall® and PowerPC®processors; IBM and Sony® Cell processors; Intel® Celeron®, Core (2) Duo®, Core i3, Core i5, Core i7, Itanium®, Pentium®, Xeon®, and XScale® processors; and similar processors. Dual microprocessors, multi-core processors, and other multi-processor architectures may also be employed as processor circuit 520.

According to some examples, apparatus 500 may include a service information module 522-1. Service information module 522-1 may be arranged for execution by processor circuit 520 to generate a bit map to indicate a type of service to wirelessly send advertisement(s) 526-b from a wireless device that includes apparatus 500 to one or more other wireless devices. For these examples, the bit map may be generated in the format of bit map format 200 and may be based on information included in service type bit map 524-a. Service type bit map 524-a may be information at least temporarily maintained by service information module 522-1 (e.g., in a data structure such as a lookup table (LUT)) that is used to build a data packet in the format of bit map format 200.

In some examples, apparatus 500 may also include a service identification module 522-2. Service identification module 522-2 may be arranged for execution by processor circuit 520 to generate a service identification for a service associated with the advertised type of service included in advertisement(s) 526-b. For these examples, public information 528-c, private information 530-d or plain text information 532-e may be information at least temporarily maintained by service identification module 522-2 (e.g., in an LUT) to populate fields in a service identification data packet in the format of service identification format 300. The fields may be populated using at least one encoding technique to include public encoding, private encoding or plain text encoding. In some examples, service identification module 522-2 may generate and include the service identification data packet in a response(s) 538-h responsive to request(s) 510 from a wireless device that has received advertisements 526-b. Alternatively, service identification module may include the service identification data packet with advertisement(s) 526-b.

In some examples, apparatus 500 may also include a service content module 522-3. Service content module 522-3 may be arranged for execution by processor circuit 520 to generate a service content data packet in the format of service content format 400 responsive to request(s) 510 for service content information for the service advertised in advertisements 526-b. For these examples, public information 534-f or plain text information 536-g may be information at least temporarily maintained by service content module 522-3 (e.g. in an LUT) to populate fields in the service content data packet. The fields may be populated using public and/or plain text encoding techniques. According to some examples, service content module 522-3 may generate and include the service content data packet in response(s) 538-*h* responsive to request(s) 510 from a wireless device that has received advertisements 526-*b*.

According to some examples, apparatus 500 may also include a service module 522-4. Service module 522-4 may be arranged for execution by processor circuit 520 to facilitate a service response to enable one or more wireless devices that sent request(s) 510 to receive service(s) 540 from the wireless device that includes apparatus 500.

Various components of apparatus 500 and a device implementing apparatus 500 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 6 illustrates an example of a first logic flow. As shown in FIG. 6, the first logic flow includes a logic flow 600. Logic flow 600 may be representative of some or all of the operations executed by one or more logic, features, or devices described herein, such as apparatus 500. More particularly, logic flow 600 may be implemented by service information module 522-1, service identification module 522-2, service content module 522-3 or service module 522-4.

In the illustrated example shown in FIG. 6, logic flow 600 may transmit, from a first wireless device, a first level of information at block 602. For these examples, the first wireless device may include an apparatus 500 and the first level of information may indicate a service type for a service provided by the first wireless device to one or more other wireless devices. Service information module 522-1, for example, may generate a bit map in the format of bit map format 200 and include the bit map in advertisement(s) 526-*b* in order to provide the first level of information.

According to some examples, logic flow 600 at block 604 may transmit a second level of information for the service at block 604. For these examples, service identification module 522-2 may generate a data packet in the format of service identification format 300 that serves as a service identification for a service associated with the type of service included in advertisement(s) 526-*b*. The service identification may serve as the second level of information and may be included in advertisement(s) 526-*b* or in response(s) 538-*h*.

According to some examples, logic flow 600 at block 606 may transmit a third level of information for the service. For these examples, service content module 522-3 may generate a service content data packet in the format of service content format 400 to provide additional or detailed information for the service associated with the type of service included in advertisement(s) 526-*b*. The service content data packet may serve as the third level of information and may be included in response(s) 538-*h*

In some examples, logic flow 600 at block 608 may provide the service to a second wireless device from among the one or more wireless devices responsive to the second wireless device requesting the service. For these examples, service module 522-4 may be arranged or configured to facilitate a service response to enable the second wireless device to receive service(s) 540 from the first wireless device that includes apparatus 500.

FIG. 7 illustrates an embodiment of a first storage medium. As shown in FIG. 7, the first storage medium includes a storage medium 700. Storage medium 700 may comprise an article of manufacture. In some examples, storage medium 700 may include any non-transitory computer readable medium or machine readable medium, such as an optical, magnetic or semiconductor storage. Storage medium 700 may store various types of computer executable instructions, such as instructions to implement logic flow 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
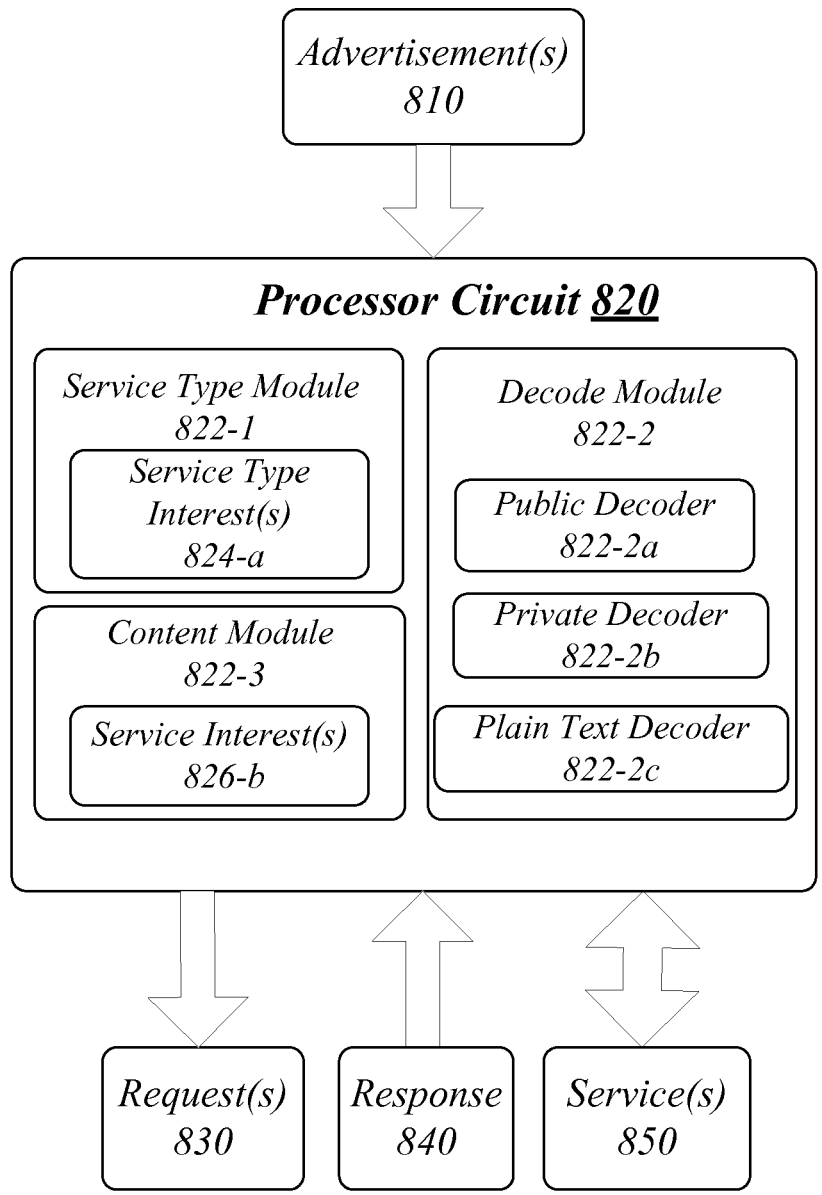
FIG. 8 illustrates an example block diagram for a second apparatus.

FIG. 8 illustrates an example block diagram for a second apparatus. As shown in FIG. 8, the second apparatus includes an apparatus 800. Although apparatus 800 shown in FIG. 8 has a limited number of elements in a certain topology or configuration, it may be appreciated that apparatus 800 may include more or less elements in alternate configurations as desired for a given implementation.

The apparatus 800 may comprise a computer-implemented apparatus 800 having a processor circuit 820 arranged to execute one or more software modules 822-*a*. Similar to apparatus 500 for FIG. 5, "a" and "b" and "c" and similar designators may be variables representing any positive integer.

According to some examples, apparatus 800 may be part of a wireless device arranged to operate in compliance with one or more wireless broadband technologies such as those described in the IEEE 802.11, Bluetooth® or 3GPP LTE Specifications. For example, apparatus 800 may be arranged or configured to communicatively couple to one or more wireless devices via an LTE and/or LTE-A, IEEE 802.11, or Bluetooth® compliant wireless network. The examples are not limited in this context.

In some examples, as shown in FIG. 8, apparatus 800 includes processor circuit 820. Processor circuit 820 may be generally arranged to execute one or more software modules 822-*a*. The processor circuit 820 can be any of various commercially available processors to include, but not limited to, those previously mentioned for processing circuit 520 for apparatus 500. Dual microprocessors, multi-core processors, and other multi-processor architectures may also be employed as processor circuit 820.

According to some examples, apparatus 800 may include a service type module 822-1. Service type module 822-1 may be arranged for execution by processor circuit 820 to determine that a type of service indicated in a bit map (e.g., in the format of bit map format 200) received in advertisement(s) 810 from a wireless device at least partially matches service type interest(s) 824-*a*. For these examples, service type interest(s) 824-*a* may be information at least temporarily maintained by service type module 822-1 (e.g., in an LUT) to indicate service type interests of a user of a wireless device that includes apparatus 800.

In some examples, apparatus 800 may also include a decode module 822-2. Decode module 822-2 may be arranged for execution by processor circuit 820 to decode a service identification in the format of service identification format 300. The service identification may have service information for a service associated with the type of service included in advertisement(s) 810. The service identification may have been included in advertisement(s) 810. Alternatively, the service identification may have been sent by the advertising wireless device responsive to request(s) 830. Request(s) 830 may have been initiated by service type module 822-1 based on a determination of at least a partial match to service type interest(s) 824-*a*. For these examples, decode module 822-2, as shown in FIG. 8 may include a public decoder 822-2*a*, a private decoder 822-2*b* or a plain text decoder 822-2*c*. According to some examples, based on the bits included in field 305 of the service identification in the format of service identification format 300, decode module 822-2 may uses these decoders to decode the service information that was encoded using at least one of public, private or plain text encoding techniques.

In some examples, apparatus 800 may also include a content module 822-3. Content module 822-3 may be arranged for execution by processor circuit 820 to determine whether the decoded service information results in a substantial match with service interest(s) 826-*b*. For these examples service interest(s) 826-*b* may include information for one or more service interests at least temporarily maintained by content module 822-3 (e.g., in an LUT). If a substantial match is determined to have occurred, content module 822-3 may cause the wireless device that includes apparatus 800 to transmit a service content request included in request(s) 830 to the advertising wireless device.

According to some examples, response 840 may be received that includes a service content data packet in the format of service content format 400. For these examples, either public decoder 822-2*a* or plain text decoder 822-2*c* may be used to decode information included in the service content data packet. Content module 822-3 may then determine whether the service content information results in a complete match with at least one of the service interest included in service interest(s) 826-*b*. In some examples, if the service content information results in a complete match, content module 822-3 may cause the wireless device that includes apparatus 800 to transmit additional request(s) 830 to receive service(s) 850 associated with the type of service included in advertisement(s) 810.

Various components of apparatus 800 and a device implementing apparatus 800 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Figure 9:
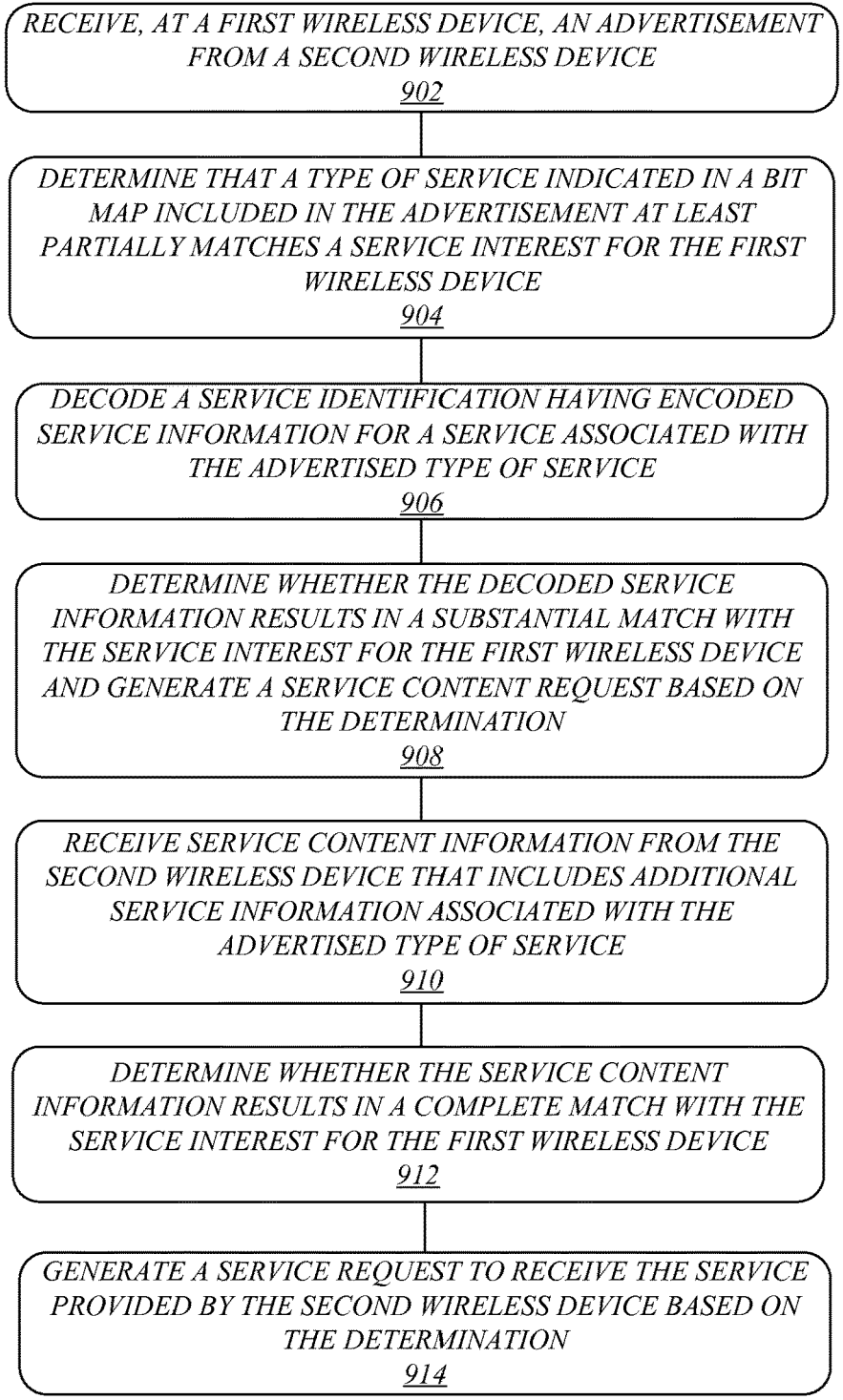
FIG. 9 illustrates an example of a second logic flow.

FIG. 9 illustrates an example of a second logic flow. As shown in FIG. 9, the second logic flow includes a logic flow 900. Logic flow 900 may be representative of some or all of the operations executed by one or more logic, features, or devices described herein, such as apparatus 800. More particularly, logic flow 900 may be implemented by service type module 822-1, decode module 822-2 or content module 822-3.

In the illustrated example shown in FIG. 9, logic flow 900 may receive, at a first wireless device, an advertisement from a second wireless device at block 902. In some examples, advertisement(s) 810 may include the advertisement from the second wireless device.

According to some examples, logic flow 900 at block 904 may determine that a type of service indicated in a bit map included in the advertisement at least partially matches a service interest for the first wireless device. For these examples, service type module 822-1 may compare the type of service indicated in the bit map to service type interest(s) 824-*a* in order to make the determination. Request(s) 830 may then be sent to the second wireless device for additional information if at least a partial match is determined.

In some examples, logic flow 900 at block 906 may decode a service identification having encoded service information for a service associated with the advertised type of service. For these examples, decode module 822-2 may decode service information encoded in the service identification received in a service identification packet in the format of service identification format 300. Based on the technique(s) used to encode the service information included in the service identification data packet, decode module 822-2 may use one or more of public decoder 822-2*a*, private decoder 822-2*b* or plain text decoder 822-2*c* to decode the encoded service information.

According to some examples, logic flow 900 may determine whether the decoded service information results in a substantial match with the service interest for the first wireless device and generate a service content request based on the determination at block 908. For these examples, content module 822-3 may compare decoded information from the received service identification with service interests 826-*b* to determine whether a substantial match has occurred. If a substantial match has occurred, content module 822-3 may cause the first wireless device to generate request(s) 830 to request service content information having additional information about the advertised service.

In some examples, logic flow 900 may receive service content information from the second wireless device that includes additional service information associated with the advertised type of service at block 910. For these examples, content module 822-3 may receive the additional service information in a service content data packet in the format of service content format 400.

According to some examples, logic flow 900 may determine whether the service content information results in a complete match with the service interest for the first wireless device at block 912. For these examples, decode module 822-2 may decode service content information included in the service content data packet based on the encoding technique(s) used by the second wireless device to encode the service content information. Content module 822-3 may then compare the decoded service content information to service interests 826(b) to make the determination of whether a complete match has occurred.

In some examples, logic flow 900 may generate a service request to receive the service provided by the second wireless device based on the determination at block 914. According to some examples, content module 822-3 may determine that the service content information equates to a complete match with one or more service interests included in service interest(s) 826-b. The request to receive the service may be included in request(s) 830 and then service(s) 850 may be received from the second wireless device.

FIG. 10 illustrates an embodiment of a second storage medium. As shown in FIG. 10, the second storage medium includes a storage medium 1000. Storage medium 1000 may comprise an article of manufacture. In some examples, storage medium 1000 may include any non-transitory computer readable medium or machine readable medium, such as an optical, magnetic or semiconductor storage. Storage medium 1000 may store various types of computer executable instructions, such as instructions to implement logic flow 900. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
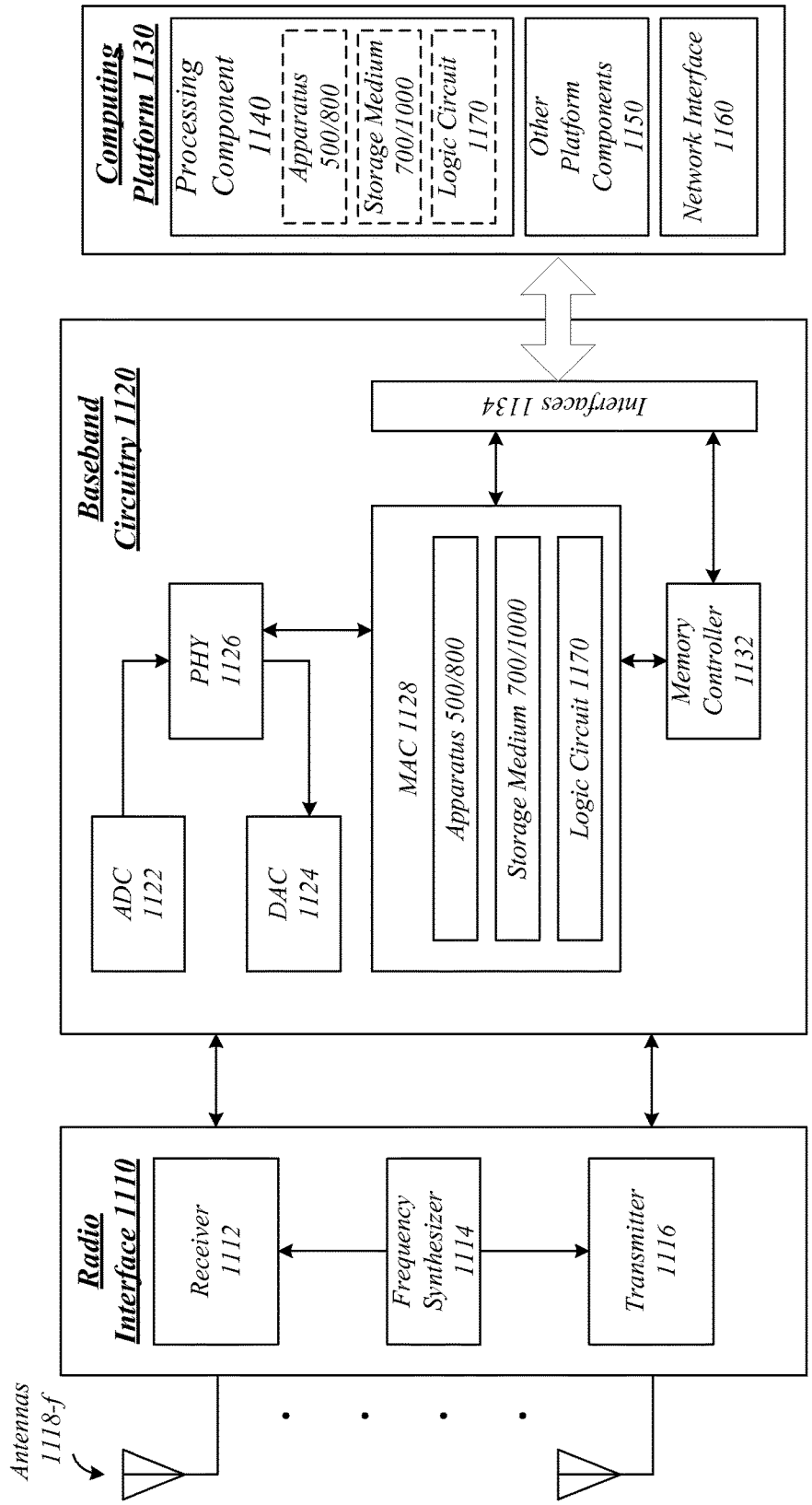
FIG. 11 illustrates an example of a device.

FIG. 11 illustrates an embodiment of a device 1100. In some examples, device 1100 may be configured or arranged for wireless communications in a wireless network. Device 1100 may implement, for example, apparatus 500 or 800, storage medium 700 or 1000 and/or a logic circuit 1170. The logic circuit 1170 may include physical circuits to perform operations described for apparatus 500 or apparatus 800. As shown in FIG. 11, device 1100 may include a radio interface 1110, baseband circuitry 1120, and computing platform 1130, although examples are not limited to this configuration.

The device 1100 may implement some or all of the structure and/or operations for apparatus 500 or 800, storage medium 700 or 1000 and/or logic circuit 1170 in a single computing entity, such as entirely within a single device. The embodiments are not limited in this context.

In one example, radio interface 1110 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1110 may include, for example, a receiver 1112, a transmitter 1116 and/or a frequency synthesizer 1114. Radio interface 1110 may include bias controls, a crystal oscillator and/or one or more antennas 1118-f. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1126 for PHY link layer processing of respective receive/transmit signals. Baseband circuitry 1120 may include, for example, a processing circuit 1128 for medium access control (MAC)/data link layer processing. Baseband circuitry 1120 may include a memory controller 1132 for communicating with MAC processing circuit 1128 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames (e.g., containing subframes). Alternatively or in addition, MAC processing circuit 1128 may share processing for certain of these functions or perform these processes independent of PHY processing circuit 1126. In some embodiments, MAC and PHY processing may be integrated into a single circuit.

Computing platform 1130 may provide computing functionality for device 1100. As shown, computing platform 1130 may include a processing component 1140. In addition to, or alternatively of, baseband circuitry 1120 of device 1100 may execute processing operations or logic for apparatus 500 or apparatus 800, storage medium 700 or storage medium 1000, and logic circuit 1170 using the processing component 1130. Processing component 1140 (and/or PHY 1126 and/or MAC 1128) may comprise various hardware elements, software elements, or a combination of both. Examples of hardware elements may include devices, logic devices, components, processors, microprocessors, circuits, processor circuits (e.g., processor circuit 1120), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 1130 may further include a network interface 1160. In some examples, network interface 1160 may include logic and/or features to support network interfaces operated in compliance with one or more wireless broadband technologies such as those described in one or more 3GPP LTE or LTE-A, IEEE 802.11, IEEE 802.16 or Bluetooth® specifications or standards.

Device 1100 may be, for example, user equipment, a computer, a personal computer (PC), a desktop computer, a laptop computer, a notebook computer, a netbook computer, a tablet, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of device 1100 described herein, may be included or omitted in various embodiments of device 1100, as suitably desired. In some embodiments, device 1100 may be configured to be compatible with protocols and frequencies associated one or more of the 3GPP LTE Specifications, IEEE 802.16 Standards for WWANs and/or other broadband wireless networks such as those associated with IEEE 802.11 for WLANs or associated with Bluetooth® for peer-to-peer networks, although the examples are not limited in this respect.

Embodiments of device 1100 may be implemented using single input single output (SISO) architectures. However, certain implementations may include multiple antennas (e.g., antennas 1118-f) for transmission and/or reception using adaptive antenna techniques for beamforming or spatial division multiple access (SDMA) and/or using multiple input multiple output (MIMO) communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

According to some examples, an example first apparatus may include a processor circuit for a first wireless device. The example first apparatus may also include a service information module arranged for execution by the processor circuit to generate a bit map to indicate a type of service wirelessly advertised by the first wireless device to one or more other wireless devices. The example first apparatus may also include a service identification module arranged for execution by the processor circuit to generate a service identification for a service associated with the advertised type of service. The service identification module to encode service information for the service using at least one encoding technique to include public encoding, private encoding or plain text encoding to generate the service identification. The example first apparatus may also include a service content module arranged for execution by the processor circuit to generate service content information having additional service information about the service.

In some examples, the example first apparatus may also include a service module arranged for execution by the processor circuit to facilitate a service response to enable the one or more other wireless devices to receive the service from the first wireless device.

In some examples, the service may include one of a social network, an entertainment guide, a restaurant guide, a friend locator service, a photo sharing service, a clothing guide, music guide, a shopping guide, a food nutrient guide, a consumer products rating guide, a store locator guide, a sale locator guide, an in-store product locator guide, a product guide or a coupon locator guide.

According to some examples, for the example first apparatus, the bit map may include a data packet having a plurality of bits and the type of service indicated by the position of a given bit relative to the plurality of bits.

According to some examples, for the example first apparatus, the service identification may include a data packet including at least three bits to indicate which encoding technique or techniques were used to encode the service information for the service and the data packet to also include the encoded service information.

In some examples, for the example first apparatus, the service identification module to encode the service information using the public encoding technique, the encoded service information using the public encoding technique to enable a second wireless device from among the one or more other wireless devices to decode the encoded service information and map decoded service information to a database.

According to some examples, for the example first apparatus, the database may be structured in a plurality of levels and the decoded service information to map to a given level that includes additional information associated with the service.

In some examples, for the example first apparatus, the database may be maintained at one of the first wireless device, the second wireless device or a server accessible to the first or second wireless devices via a network connection.

According to some examples, for the example first apparatus, the service identification module may encode the service information using the private encoding technique that includes using a hash function to encode the service information. The encoded service information my be arranged to be decoded by a second wireless device from among the one or more other wireless devices that has knowledge of the hash function used to encode the service information.

In some examples, for the example first apparatus, the service identification module may encode the service information using the plain text encoding technique that includes using a character-encoding scheme to include ASCII.

According to some examples, for the example first apparatus, the first wireless device may be configured to operate in compliance with at least one or more wireless communication standards to include those associated with 3GPP LTE to include LTE-A, IEEE 802.11 or Bluetooth®. The first wireless device may wirelessly advertise the type of service to the one or more other wireless devices using a wireless communication protocol included in the one or more wireless communication standards.

In some examples, for the example first apparatus, a digital display may be coupled to the processor circuit to present a user interface view for a user of the first wireless device.

According to some examples, an example second apparatus may include a processor circuit for a first wireless device. The example second apparatus may also include a service type module arranged for execution by the processor circuit to determine that a type of service indicated in a bit map wirelessly advertised by a second wireless device at least partially matches a service interest for the first wireless device. The example second apparatus may also include a decode module arranged for execution by the processor circuit to decode a service identification having encoded service information for a service associated with the advertised type of service. The example second apparatus may also include a content module arranged for execution by the processor circuit to determine whether the decoded service information results in a substantial match with the service interest for the first wireless device and to generate a service content request based on the determination.

In some examples, for the example second apparatus, the content module may cause the first wireless device to transmit the service content request to the second wireless device for the second wireless device to receive service content information having additional service information associated with the advertised type of service.

According to some examples, for the example second apparatus, the content module may determine whether the service content information received at the first wireless device responsive to the content request results in a complete match with the service interest for the first wireless device. For these examples, the content module may then generate a service request to receive the service associated with the advertised type of service from the second wireless device based on the determination.

In some examples, for the example second apparatus, the service may include one of a social network, an entertainment guide, a restaurant guide, a friend locator service, a photo sharing service, a clothing guide, music guide, a shopping guide, a food nutrient guide, a consumer products rating guide, a store locator guide, a sale locator guide, an in-store product locator guide, a product guide or a coupon locator guide.

According to some examples, for the example second apparatus, the bit map may include a data packet having a plurality of bits and the type of service indicated by the position of a given bit relative to the plurality of bits.

In some examples, for the example second apparatus, the encoded service information may be received in a data packet having at least three bits to indicate one or more encoding techniques used to encode the service information for the service. The one or more encoding techniques may include public encoding, private encoding or plain text encoding.

According to some examples, the example second apparatus may include a digital display coupled to the processor circuit to present a user interface view for a user of the first wireless device.

According to some examples, for the example second apparatus, the first wireless device may be configured to operate in compliance with at least one or more wireless communication standards to include those associated with 3GPP LTE to include LTE-A, IEEE 802.11 or Bluetooth®. The first wireless device may wirelessly advertise the type of service to the one or more other wireless devices using a wireless communication protocol included in the one or more wireless communication standards.

In some examples, example methods may include transmitting, from a first wireless device, a first level of information indicating a service type for a service provided by the first wireless device to one or more other wireless devices. The first level of information may enable the one or more other wireless devices to determine whether the indicated service type at least partially matches a service interest for the one or more other wireless devices. A second level of information for the service may then be transmitted that includes a service identification to enable a second wireless device from among one of the one or more other wireless devices to determine whether the service substantially matches the service interest for the second wireless device. A third level of information for the service may then be transmitted that includes service content information responsive to the second wireless device requesting the service content information.

According to some examples for the example methods, the service content information may enable the second wireless device to determine whether the service content information completely matches the service interest for the second wireless device.

In some examples for the example methods, providing the service to the second wireless device responsive to the second wireless device requesting the service may be based on a determination of the service content information completely matching the service interest for the second wireless device.

According to some examples for the example methods, the service to include one of a social network, an entertainment guide, a restaurant guide, a friend locator service, a photo sharing service, a clothing guide, music guide, a shopping guide, a food nutrient guide, a consumer products rating guide, a store locator guide, a sale locator guide, an in-store product locator guide, a product guide or a coupon locator guide.

According to some examples, at least one machine readable medium comprising a plurality of instructions that in response to being executed on a system cause the system to carry out the example method as mentioned above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
    memory storing instructions:
    a processor circuit for a first wireless device and coupled with the memory, the processor circuit operable to execute the instructions, that when executed, cause the processor circuit to:
        generate a bit map to indicate a type of service wirelessly advertised by the first wireless device to one or more other wireless devices;
        transmit the bit map to the one or more other wireless devices;
        encode service information for a service using at least one encoding technique to include public encoding, private encoding, and plain text encoding to generate a service identification for the service associated with the advertised type of service, the service identification comprised in a data packet, the data packet including:
            the encoded service information;
            a first bit of one or more bits to indicate whether the service information is encoded with the public encoding technique, the service information encoded with the public encoding technique comprised in a first field of the data packet corresponding with the first bit;
            a second bit of the one or more bits to indicate whether the service information is encoded with the private encoding technique, the service information encoded with the private encoding techniques comprised in a second field of the data packet corresponding with the second bit; and
            a third bit of the one or more bits to indicate whether the service information is encoded with the plain text encoding technique, the service information encoded with the plain text encoding technique comprised in a third field of the data packet corresponding with the third bit;
        transmit the data packet to at least one of the one or more other wireless devices;
        generate service content information having additional service information about the service; and
        transmit the service content information to at least one of the one or more other wireless devices.

2. The apparatus of claim 1, the processor circuit to facilitate a service response to enable the one or more other wireless devices to receive the service from the first wireless device.

3. The apparatus of claim 2, the service comprising one of a social network, an entertainment guide, a restaurant guide, a friend locator service, a photo sharing service, a clothing guide, music guide, a shopping guide, a food nutrient guide, a consumer products rating guide, a store locator guide, a sale locator guide, an in-store product locator guide, a product guide or a coupon locator guide.

4. The apparatus of claim 1, the bit map comprising a data packet having a plurality of bits and the type of service indicated by the position of a given bit relative to the plurality of bits.

5. The apparatus of claim 1, the processor circuit to encode the service information using the public encoding technique, the encoded service information using the public encoding technique to enable a second wireless device from among the one or more other wireless devices to decode the encoded service information and map decoded service information to a database.

6. The apparatus of claim 5, comprising the database structured in a plurality of levels and the decoded service information to map to a given level that includes additional information associated with the service.

7. The apparatus of claim 5, comprising the database to be maintained at one of the first wireless device, the second wireless device or a server accessible to the first or second wireless devices via a network connection.

8. The apparatus of claim 1, the processor circuit to encode the service information using the private encoding technique that includes using a hash function to encode the service information, the encoded service information arranged to be decoded by a second wireless device from among the one or more other wireless devices that has knowledge of the hash function used to encode the service information.

9. The apparatus of claim 1, the processor circuit to encode the service information using the plain text encoding technique that includes using a character-encoding scheme to include American Standard Code for Information Interchange (ASCII).

10. The apparatus of claim 1, comprising the first wireless device configured to operate in compliance with at least one or more wireless communication standards to include those associated with $3^{rd}$ Generation Partnership Project (3GPP) Long Term Evolution (LTE) standards to include LTE-Advanced (LTE-A), the Institute of Electrical Engineers (IEEE) 802.11 standards or Bluetooth Core specifications, the first wireless device to wirelessly advertise the type of service to the one or more other wireless devices using a wireless communication protocol included in the one or more wireless communication standards.

11. The apparatus of claim 1, comprising a digital display coupled to the processor circuit to present a user interface view for a user of the first wireless device.

12. An apparatus comprising:
memory storing instructions;
a processor circuit for a first wireless device and coupled with the memory, the processor circuit operable to execute the instructions, that when executed, cause the processor circuit to:
receive a bit map from a second wireless device;
determine that a type of service indicated in the bit map wirelessly advertised by the second wireless device at least partially matches a service interest for the first wireless device;
receive a data packet from the second wireless device;
decode a service identification having encoded service information for a service associated with the advertised type of service, the service identification comprised in the data packet including:
a first bit of one or more bits to indicate whether the service information is encoded with the public encoding technique, the service information encoded with the public encoding technique comprised in a first field of the data packet corresponding with the first bit;
a second bit of the one or more bits to indicate whether the service information is encoded with the private encoding technique, the service information encoded with the private encoding techniques comprised in a second field of the data packet corresponding with the second bit; and
a third bit of the one or more bits to indicate whether the service information is encoded with the plain text encoding technique, the service information encoded with the plain text encoding technique comprised in a third field of the data packet corresponding with the third bit;
determine whether the decoded service information results in a substantial match with the service interest for the first wireless device and to generate a service content request based on the determination; and
cause the transmission of the service content request to the second wireless device.

13. The apparatus of claim 12, the processor circuit to determine whether the service content information received at the first wireless device responsive to the content request results in a complete match with the service interest for the first wireless device and generate a service request to receive the service associated with the advertised type of service from the second wireless device based on the determination.

14. The apparatus of claim 13, the service comprising one of a social network, an entertainment guide, a restaurant guide, a friend locator service, a photo sharing service, a clothing guide, music guide, a shopping guide, a food nutrient guide, a consumer products rating guide, a store locator guide, a sale locator guide, an in-store product locator guide, a product guide or a coupon locator guide.

15. The apparatus of claim 12, the bit map comprising a data packet having a plurality of bits and the type of service indicated by the position of a given bit relative to the plurality of bits.

16. The apparatus of claim 12, comprising a digital display coupled to the processor circuit to present a user interface view for a user of the first wireless device.

17. The apparatus of claim 12, comprising the first wireless device configured to operate in compliance with at least one or more wireless communication standards to include $3^{rd}$ Generation Partnership Project (3GPP) Long Term Evolution (LTE) standards to include LTE-Advanced (LTE-A), Institute of Electrical Engineers (IEEE) 802.11 standards or Bluetooth Core specifications.

18. A method comprising:
transmitting, from a first wireless device, a first level of information indicating a service type for a service provided by the first wireless device to one or more other wireless devices, the first level of information to enable the one or more other wireless devices to determine whether the indicated service type at least partially matches a service interest for the one or more other wireless devices;
transmitting a second level of information for the service that includes a service identification to enable a second wireless device from among one of the one or more other wireless devices to determine whether the service substantially matches the service interest for the second wireless device, the service identification comprised in a data packet, the data packet to comprise encoded service information, the data packet to include:
a first bit of one or more bits to indicate whether the service information is encoded with the public encoding technique, the service information encoded with the public encoding technique comprised in a first field of the data packet corresponding with the first bit;
a second bit of the one or more bits to indicate whether the service information is encoded with the private encoding technique, the service information encoded with the private encoding techniques comprised in a second field of the data packet corresponding with the second bit; and
a third bit of the one or more bits to indicate whether the service information is encoded with the plain text encoding technique, the service information encoded with the plain text encoding technique comprised in a third field of the data packet corresponding with the third bit; and
transmitting a third level of information for the service that includes service content information responsive to the second wireless device requesting the service content information.

19. The method of claim 18, comprising the service content information to enable the second wireless device to determine whether the service content information completely matches the service interest for the second wireless device.

20. The method of claim 19, comprising providing the service to the second wireless device responsive to the second wireless device requesting the service based on a determination of the service content information completely matching the service interest for the second wireless device.

21. The method of claim 20, the service comprising one of a social network, an entertainment guide, a restaurant guide, a friend locator service, a photo sharing service, a clothing guide, music guide, a shopping guide, a food nutrient guide, a consumer products rating guide, a store locator guide, a sale locator guide, an in-store product locator guide, a product guide or a coupon locator guide.

22. At least one non-transitory machine-readable medium comprising a plurality of instructions that in response to being executed on a first wireless device cause the first wireless device to:

receive a bit map advertised by a second wireless device;
determine that a type of service indicated in the bit map wirelessly advertised by the second wireless device at least partially matches a service interest for the first wireless device;
receive a service identification from the second wireless device;
decode the service identification having encoded service information associated with the advertised type of service, the service identification comprised in a data packet including:
  a first bit of one or more bits to indicate whether the service information is encoded with the public encoding technique, the service information encoded with the public encoding technique comprised in a first field of the data packet corresponding with the first bit;
  a second bit of the one or more bits to indicate whether the service information is encoded with the private encoding technique, the service information encoded with the private encoding techniques comprised in a second field of the data packet corresponding with the second bit; and
  a third bit of the one or more bits to indicate whether the service information is encoded with the plain text encoding technique, the service information encoded with the plain text encoding technique comprised in a third field of the data packet corresponding with the third bit;
determine whether the decoded service information results in a substantial match with the service interest for the first wireless device; and
generate a service content request based on the determination.

23. The at least one non-transitory machine-readable medium of claim 22, the plurality of instructions to also cause the first wireless device to:
  determine whether service content information having additional service information associated with the advertised type of service received at the first wireless device responsive to the service content request results in a complete match with the service interest for the first wireless device and generate a service request to receive the service associated with the additional type of service from the second wireless device based on the determination.

24. The at least one non-transitory machine-readable medium of claim 23, the service comprising one of a social network, an entertainment guide, a restaurant guide, a friend locator service, a photo sharing service, a clothing guide, music guide, a shopping guide, a food nutrient guide, a consumer products rating guide, a store locator guide, a sale locator guide, an in-store product locator guide, a product guide or a coupon locator guide.

* * * * *